United States Patent [19]

Fein

[11] Patent Number: 4,852,983

[45] Date of Patent: Aug. 1, 1989

[54] DISTANCE SIMULATOR

[75] Inventor: Michael E. Fein, Mountain View, Calif.

[73] Assignee: Spectra-Physics, Inc., San Jose, Calif.

[21] Appl. No.: 99,103

[22] Filed: Sep. 21, 1987

[51] Int. Cl.$^4$ .............................................. G02B 26/00
[52] U.S. Cl. ...................................... 350/453; 350/570
[58] Field of Search ................................. 350/453, 570

[56] References Cited

U.S. PATENT DOCUMENTS 4,062,634 12/1977 Rando et al.
4,621,890 11/1986 Suzuki et al. ........................ 350/453

FOREIGN PATENT DOCUMENTS 0079184 12/1917 Austria ................................ 350/453

Primary Examiner—Rodney B. Bovernick
Assistant Examiner—Rebecca D. Gass
Attorney, Agent, or Firm—Killworth, Gottman, Hagan & Schaeff

[57] ABSTRACT

An optical system simulates the optical effect of traveling over a large distance on light traveling from a first reference surface to a second reference surface. The first and second reference surfaces are relatively closely spaced. A first afocal magnifying lens system receives light from the first reference surface and provides a magnification ratio of $M_1$. A second afocal magnifying lens system, spaced from the first afocal magnifying lens system by a predetermined distance D, receives light from the from the first afocal magnifying lens system and transmits it to the second reference surface with a magnification ratio of $M_2$. The length of the distance which is simulated is related to the magnification ratio $M_1$ of the first afocal magnifying lens system and to the predetermined distance D. The scale of the output image is related to magnification ratio $M_2$.

24 Claims, 5 Drawing Sheets

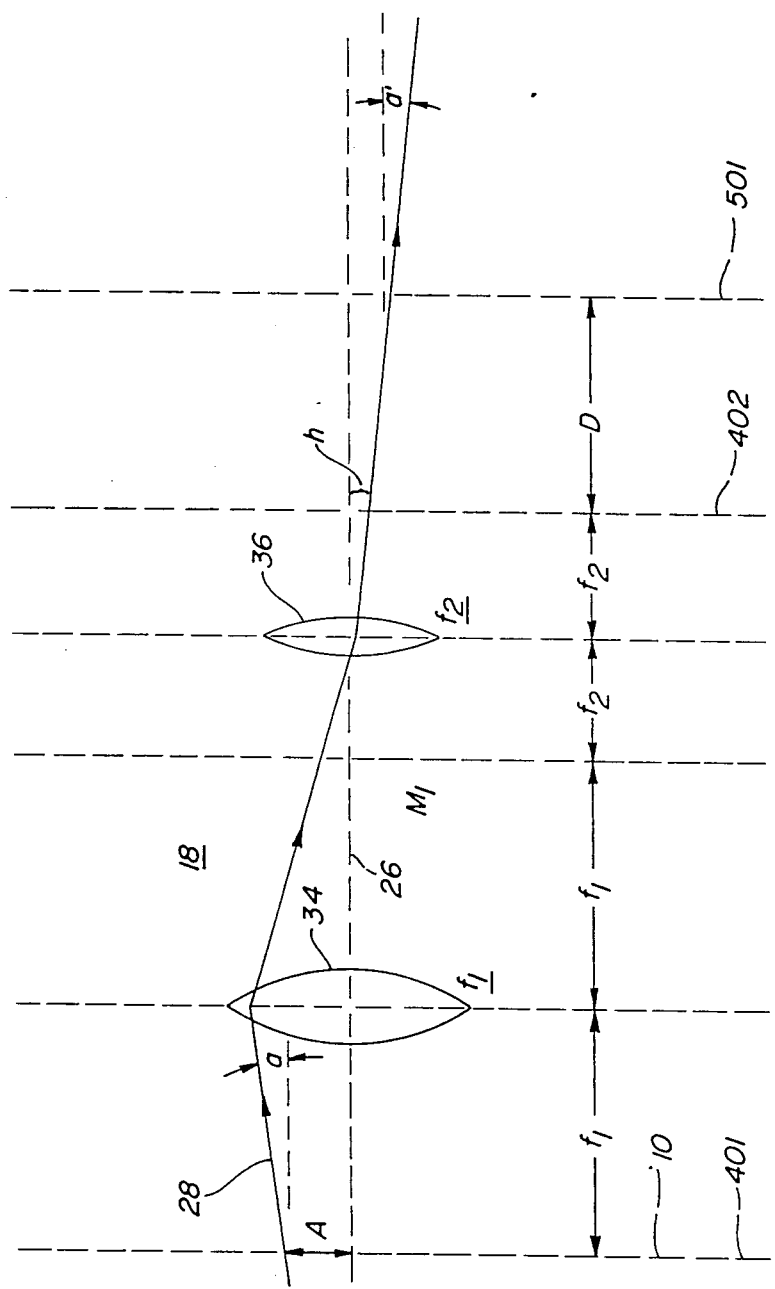

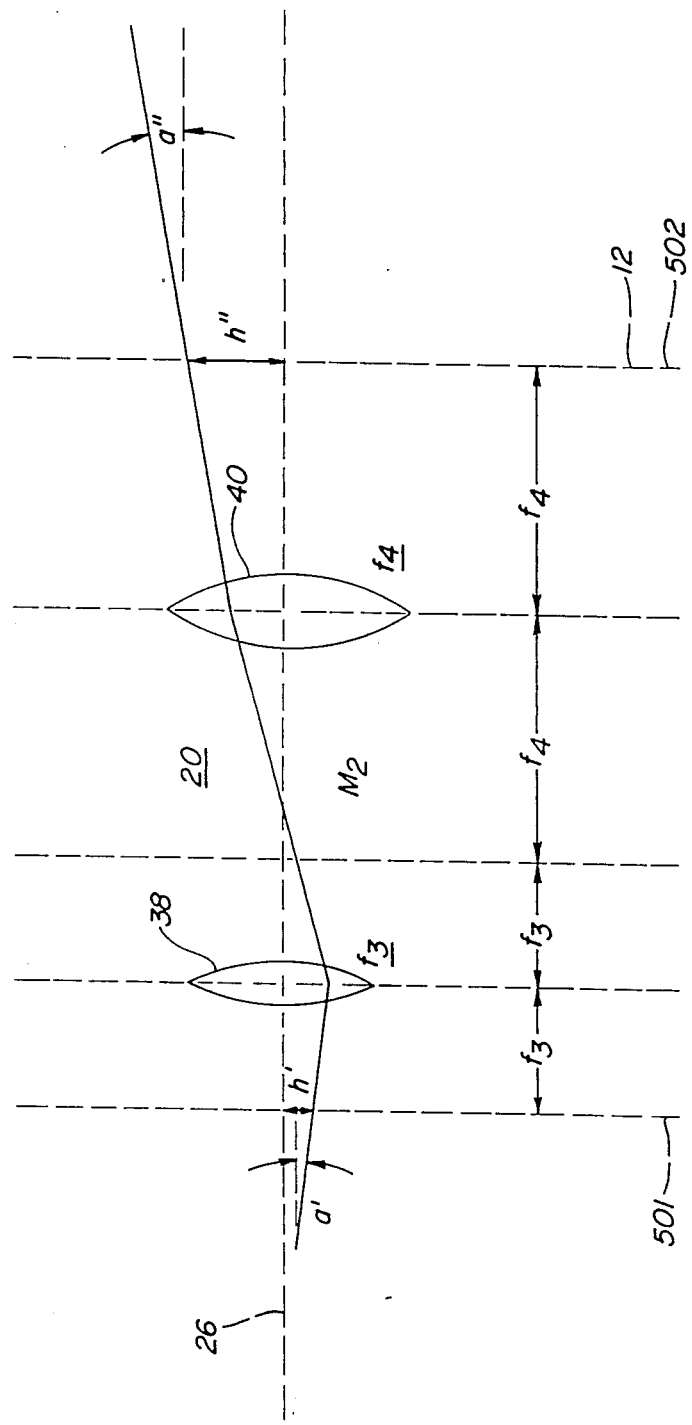

DISTANCE SIMULATOR

BACKGROUND OF THE INVENTION

The present invention relates to an optical system for simulating on a beam of light the effects of traveling over a large distance and, more particularly, to such an optical system in which light exiting the system has the same direction, relative position, and intensity distribution which it would have after traveling a substantially greater distance.

Various types of optical equipment have been developed which utilize a beam of laser light (or a beam of incoherent light) as a reference over substantial distances. For example, a laser beam may be rotated in a selected horizontal or graded angle plane at a construction site and detected by appropriate survey detectors, as suggested by U.S. Pat. No. 4,062,634, issued Dec. 13, 1977, to Rando et al, and assigned to the assignee of the present invention. Such a laser beam projection arrangement may also be utilized with equipment which effects automatic control of grading machinery. Stationary beam projection devices are utilized in trenching operations and many other construction applications. With all such applications, it is common for the laser beam to be detected at substantial distances from the projection device, on the order of 1500 feet or more.

It will be appreciated that a part of evaluating a laser beam projection device or an incoherent optical beam projection device is the evaluation of the beam which it produces at typical operating distances from the projection device. It is desirable to determine the direction, divergence, intensity distribution, and cross-sectional shape of the beam at working distances. Optical components, such as lenses, which are used in optical equipment that works over long distances, often have small imperfections, which cause small distortions in the optical beam that only become apparent at long distances. In order to avoid unnecessary and costly rejections of imperfect optical components, it is sometimes desirable to observe directly what effect those components will have when the optical equipment is used at long distances. This permits rejection criteria to be related to the actual condition in which the components are used.

Heretofore, it has been necessary to test laser beam projection devices, and other optical systems which operate over substantial distances, by actual tests made at normal working distances. This is both inconvenient and a source of possible measurement error. If a laser projection device is tested outdoors, the beam produced will typically be subjected to refraction by thermal variations in the air over the beam path. Air movement will continuously alter the refraction produced in this manner, making accurate testing difficult. Additionally, if the test requires that ambient light be eliminated or minimized, it may be necessary to perform the test at night.

It will be appreciated that it would be much preferred to perform testing under the controlled conditions afforded by a laboratory, but that most laboratories are too small in size to permit the projection of light over substantial distances. Accordingly, it is seen that there is a need for an optical system which permits the simulation of substantial distances within confined space limitations.

SUMMARY OF THE INVENTION

An optical system according to the present invention simulates the optical effect of traveling over a large distance on light traveling from a first reference surface to a second reference surface, in which the first and second reference surfaces are relatively closely spaced. The system includes a first afocal magnifying lens system for receiving light from the first reference surface and providing a magnification ratio of $M_1$, and a second afocal magnifying lens system. The second afocal magnifying lens system is spaced from the first afocal magnifying lens system by a predetermined distance D, and receives light from the first afocal magnifying lens system and transmits it to the second reference surface with a magnification ratio of $M_2$. The magnitude of magnification $M_1$ is less than 1, and the magnitude of magnification $M_2$ will usually be greater than 1. The length of the distance which is simulated is related to the magnification ratio $M_1$ of the first afocal magnifying lens system and to the predetermined distance D. The scale of the output optical image is related to the magnification ratio $M_2$ of the second afocal magnifying lens system. Assuming that $M_2 = 1/M_1$, the distance which is simulated is equal to $M_2^2 D$ or $D/M_1^2$.

The first afocal lens system forms an image of the first reference surface at a third reference surface. The second afocal lens system forms an image of the second reference surface at a fourth reference surface. The distance D is measured between the second and fourth reference surfaces.

Note that, throughout this specification, magnifications $M_1$ and $M_2$ refer to so-called linear magnification, i.e. magnification of lengths. As is well known, an afocal optical system which magnifies lengths by M will magnify angles by $1/M$.

The first afocal magnifying lens system may comprise a first converging lens means for receiving light from the first reference surface. The first afocal magnifying lens system may further comprise first diverging lens means for receiving light from the first converging lens means. The first converging lens means and the first diverging lens means may have substantially coincident focal points.

The second afocal magnifying lens system may include second diverging lens means for receiving light from the first afocal magnifying lens system. The second afocal magnifying lens system further may comprise second coverging lens means for receiving light from the second diverging lens means and for directing it to the second reference surface.

Alternatively, the first afocal magnifying lens system may comprise second converging lens means for receiving light from the first converging lens means. The first and second converging lens means may have substantially coincident focal points.

The second afocal magnifying lens system may include third converging lens means for receiving light from the first afocal magnifying lens system. The second afocal magnifying lens system may further comprise fourth converging lens means for receiving light from the third converging lens means and for directing it to the second reference surface.

According to a second embodiment of the present invention, an optical system for providing a simulation to light traveling therethrough of a distance which is substantially greater than the distance which the light actually travels comprises an afocal lens system for providing a magnification ratio of $M_1$ to light traveling therethrough, $M_1$ having a magnitude less than 1. Means are provided for imaging the light after it has traveled a distance D beyond the afocal lens system to generate an observable pattern. Finally, scaling means are provided for multiplying the scale of the observable pattern by $1/M_1$ to simulate the effect of propagation through a distance $D/M_1^2$. The scaling means can comprise a video camera and a monitor.

Accordingly, it is an object of the present invention to provide an optical system which simulates accurately the effects upon light which passes therethrough of travel over substantially greater distances than the light actually travels; to provide such an optical system in which the length of the distance which is simulated may be easily and accurately determined and adjusted; and to provide such an optical system which is simple in construction and accurate in the degree of simulation.

Other objects and advantages of the invention will be apparent from the following description, the accompanying drawings and the appended claims.

BRIEF DESCRIPTION OF THE DRAWINGS

FIGS. 3A and 3B schematically represent first and second afocal magnifying lens systems, respectively, which together make up a first embodiment of the present invention.

DETAILED DESCRIPTION OF THE PREFERRED EMBODIMENTS

Figure 1:
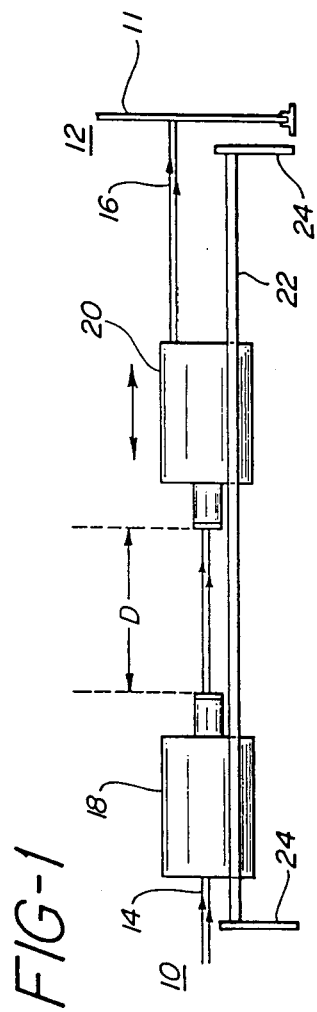
FIG. 1 is a side view of an optical system, constructed according to the present invention, for simulating on light the optical effect of traveling over a large distance.

The present invention relates to an optical system for simulating the optical effect of traveling over a large distance on light which actually travels only a relatively short distance. FIG. 1 is a side view of the system of the present invention. Light from a source (not shown) at a first reference surface 10 travels through the system to a projection screen 11 at a second reference location 12. Although the first and second reference surfaces 10 and 12 may be spaced apart by a relatively short distance, on the order of six feet, the optical system modifies the initial beam of light 14 such that it has the appearance upon reaching reference surface 12 as beam 16 that it would have after having traveled a much greater distance, for example 1500 feet. The simulation accurately depicts the position, shape, dimension, intensity distribution, and orientation of the beam 16 as though it had traveled this extended distance.

The optical system includes a first afocal magnifying lens system 18 which receives the light 14 from the first reference surface and which provides a magnification ratio of $M_1$. System 18 may, for example be a Galilean or Newtonian telescope which is focused at infinity. The optical system further includes a second afocal magnifying lens system 20, which also may be a Galilean or Newtonian telescope, focused at infinity, having a magnification ratio $M_2$. Magnifying lens system 18 and magnifying lens system 20 may be housed in generally cylindrical casings and supported on an optical bench, such as the pair of parallel support rods 22, only one of which can be seen in FIG. 1. Rods 22 are attached to end elements 24 so as to elevate rods 22, permitting movement of the lens systems 18 and 20 therealong and adjustment of the predetermined distance D between the lens system 18 and 20. As will be explained below distance D is measured between certain points that will not, in most embodiments of this invention coincide with any physical glass surfaces. As discussed more fully below, the length of the distance which is simulated is related to the magnification ratio $M_1$ of the first magnifying lens system 18 and to the predetermined distance D. The scale of the image at location 12 is determined by magnification ratio $M_2$ of lens system 20. Preferably, $M_2$ equals $1/M_1$, and the simulated distance equals $M_2^2 D$ or $D/M_1^2$.

FIGS. 3A and 3B illustrate a first embodiment of the optical system of the present invention in which the first and second afocal magnifying lens systems 18 and 20 are configured as a pair of Newtonian telescopes which are axially aligned with a reference axis 26. Lens systems 18 and 20 are so oriented that first system 18 reduces the scale of the image that enters it, and second system 20 enlarges the image which it receives. Systems 18 and 20 are separated by a predetermined distance D, which is measured between points which will become apparent in the following paragraphs. The arrangement of the system may best be visualized by placing FIG. 3B to the right of FIG. 3A. Consideration will be given to the operation of this optical system from a geometric optics standpoint, but it will be appreciated that the system provides accurate simulation from a diffraction optics standpoint, as well.

Figure 2:
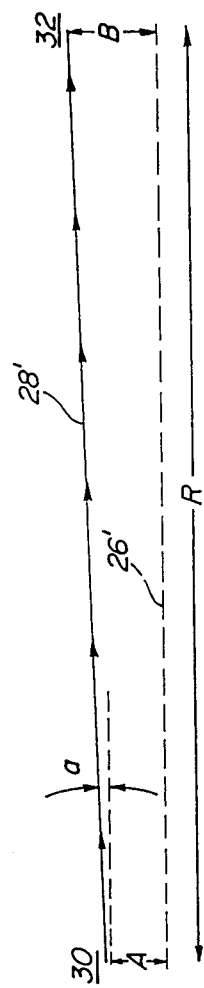
FIG. 2 is a schematic representation of a ray of light, traversing a distance R, useful in understanding the present invention.

FIG. 2 illustrates the geometry of a single ray 28' traveling a distance R, which distance is to be simulated by the present invention. The ray travels from a first location 30, where it is offset by a distance A and at an angle a with respect to a reference axis 26', to a second location 32, where it is offset by a distance B and still at an angle a with respect to the reference axis 26'. For small angles a, $B = aR + A$. This is the geometric arrangement which the present invention simulates in a confined space.

As shown in FIGS. 3A and 3B, the first afocal magnifying lens system 18 includes first and second converging lens means 34 and 36, having focal lengths of $F_1$ and $F_2$, respectively. Similarly, the second afocal magnifying lens system 20 includes third and fourth converging lens means 38 and 40, having focal lengths of $F_3$ and $F_4$, respectively. The first afocal magnifying lens system 18 has an input plane 401 (which is also first reference surface 10) and an output plane 402, separated by a distance D from the second afocal magnifying lens system 20 which has an input plane 501 and an output plane 502 (which is also second reference surface 12). The distances between lenses, and the distances of planes 401, 402, 501, and 502 from the lenses, are as shown in FIGS. 3A and 3B.

It will be understood by those skilled in optical design that output plane 402 is the image, formed by lens system 18, of input plane 401. Similarly, input plane 501 is the image, formed by lens system 20, of output plane 502. It is thus true for this optical system, as for other systems contemplated within the scope of this invention, that distance D is measured between:

a third reference surface, which is the image formed by a first afocal optical system of a first reference surface, and a fourth reference surface, which is the image formed by a second afocal optical system of a second reference surface.

From a conventional thin-lens analysis of Newtonian telescopes, the ray height and slope at the output of the first afocal optical system in FIG. 3A are, respectively:

$$h = -\left(\frac{f_2}{f_1}\right)A \tag{1}$$

and $$a' = -\left(\frac{f_1}{f_2}\right)a \tag{2}$$

where the sign convention is that positive distance is upward and positive angles are counterclockwise from the positive x axis.

The magnification $M_1$ of system 18 is defined as $$M_1 = \frac{h}{A}. \tag{3}$$

So, $M_1 = -\frac{f_2}{f_1}$ (4)

Therefore, $$h = M_1 A \tag{5}$$

$$a' = \frac{1}{M_1} a \tag{6}$$

Similarly, we define $$M_2 = \frac{h''}{h'}, \tag{7}$$

and find that $$h'' = M_2 h', \tag{8}$$

$$a'' = \frac{1}{M_2} a'. \tag{9}$$

The effect of distance D is that $$h' = h + a'D \tag{10}$$

Now substituting (5) and (6) in (10), we obtain $$h' = M_1 A + \frac{a}{M_1} D \tag{11}$$

Substituting (11) in (8), we obtain $$h'' = (M_2 M_1)A + \frac{M_2}{M_1} D a \tag{12}$$

Substituting (6) in (9), we obtain $$a'' = \frac{1}{M_1 M_2} a \tag{13}$$

Now in the special case of $$M_2 = \frac{1}{M_1},$$

(12) and (13) simplify to $$h'' = A + \left(\frac{D}{M_1^2}\right)a \tag{14}$$

$$a'' = a \tag{15}$$

This defines the basic distance simulator.

Equations (14) and (15) show that, according to the paraxial geometric optical theory presented, angle $a''$ and altitude $h''$ are indistinguishable from the angle and altitude which ray 28 would have attained (in the absence of the distance simulator) by propagating through an actual distance $(D/M_1^2)$. It should be understood that $M_2$ need not be exactly equal to $1/M_1$. It will become apparent below that small differences of $M_2$ from $1/M_1$ will result only in small errors in the size of the simulated image, but not in changes in such things as the shape of the intensity distribution in the output light beam. The distance simulating effect is primarily associated with the action of the first lens system 18 and of the distance D. The second lens system 20 acts as a magnifying viewer, to return the image to the correct scale. If we require a complete simulation, which is to say that all rays are to be brought to the same altitude and angle that they would have in the situation being simulated, then the second lens system 20 becomes essential.

The different roles of the two lens systems can be better seen by letting $$M_2 = \frac{k}{M_1} \tag{16}$$

where k is a positive number (in the special case just discussed, we had k=1).

Substituting (16) in (12) and (13), we obtain:

$$h'' = k\left(A + \frac{D}{M_1^2} a\right) \tag{17}$$

$$a'' = \frac{1}{k} a \tag{18}$$

Equation (17) shows that the intensity distribution at the output of the optical system is a simulation of the distribution at an actual distance $D/M_1^2$, and that the size of the image is scaled by k. Equation (18) shows that the angles of rays emerging from the distance simulator have been reduced by a factor k from the angles that would pertain at the simulated distance.

One way to interpret Equations (17) and (18) is to recognize that the image seen at the output of the distance simulator is just what would be observed at the output of an afocal optical system of magnification k, placed at a distance $D/M_1^2$ from the source in the real scene (i.e. at plane 32 in FIG. 2).

One implication of this is that if we care only about the intensity distribution in the image, and are prepared to correct observations for scale, the second lens system 20 may be omitted. The image may simply be allowed to fall on a projection screen, or on an image-sensing device, such as the face of a camera tube. Scaling of the image may be accomplished electronically, if desired, by transmitting the output of the camera tube to an appropriately-sized video monitor.

Figure 4:
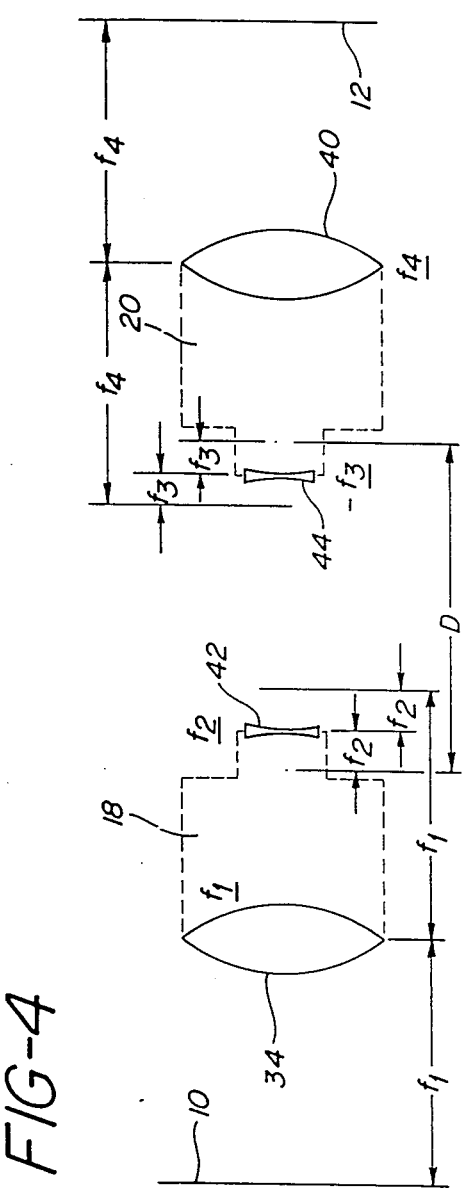
FIG. 4 is a schematic representation of a second embodiment of the present invention.

FIG. 4 depicts a second embodiment of the present invention in which the first and second afocal magnifying lens systems 18 and 20, respectively, comprise Galilean telescopes. Thus, light leaving the first converging lens means 34 is received by a first diverging lens means 42 whose focal length is $-f_2$. The light traverses the distance D and enters a second diverging lens means 44, of focal length $-f_3$, before passing through the second converging lens means 40.

Those skilled in optical design will recognize in FIG. 4 that, as is required for collimation of a Galilean telescope, the second focal point of converging lens 34 substantially coincides with the second focal point of diverging lens 42. This may be compared with the Newtonian telescope of FIG. 3A in which the second focal point of converging lens 34 substantially coincides with the first focal point of converging lens 36, as is known to be required for proper collimation of a Newtonian telescope.

It can be seen in FIG. 4 that distance D is measured with respect to the first focal plane of lens 42, which is the image of input plane 10 formed by lens system 18. The other terminus of distance D is the second focal plane of lens 44, which is the image formed by lens system 20 of output plane 12.

The embodiment shown in FIG. 4 provides the same accurate simulation of distance as that provided by the first embodiment.

The theory of operation of the present invention has been described above in a very simplified fashion, using paraxial geometric optics in the thin-simple-lens approximation. It will be understood by those skilled in the art of optical design that similar conclusions can be drawn for thick-lens optics, for systems incorporating compound lenses, and for systems in which the ray angles exceed the paraxial range, so long as the lenses used are of proper design. Among the requirements on the lens design are that geometric aberrations be negligible compared to the effects which are to be measured, and that chromatic aberrations be similarly negligible over the range of wavelengths at which measurements are to be taken.

There is a further surprising and important generalization of the theory of the present invention. It 3as surprisingly discovered that the invention provides correct simulation not only in the geometric-optics approximation, but also in the more exact wave optical analysis. It can be shown by scalar diffraction theory that, given lenses of sufficient quality, the simulation system described herein will correctly simulate the complete effect of long distance propagation on both amplitude and phase of a wavefront traveling through the system. This is to say that, to an approximation sufficient for many practical measurements, the wavefront emerging from the system is indistinguishable from the wavefront that would be seen at the simulated distance.

The fact that simulation is effective at the level of diffraction behavior is crucial to the effectiveness of the system in many practical applications. For example, in the operation of certain laser beam projection devices, a laser beam whose wavefront is approximately Gaussian passes through a window having minor optical aberrations, whose effects would ordinarily be apparent only after the beam had propagated for a considerable distance. Over a propagation distance, which may be on the order of 1500 feet, the amplitude, phase, and intensity distributions of that wavefront change in a complex way, which can only be described correctly by wave-optical methods. It has been shown, both theoretically and by experiments, that these wave-optical effects are properly simulated by the present invention.

In order for the present invention properly to simulate wave optical effects, it will generally be desirable that its performance be of the quality often described as diffraction limited. The term "diffraction limited" is understood by those skilled in the optical design art to have a meaning which must be interpreted in light of the particular measurements to be taken. Generally, it implies that wavefront aberrations introduced by the optics are small compared to fundamental limits imposed by the laws of physics, the exact meaning of "small" depending on the size of the effects which are to be observed.

Figure 5:
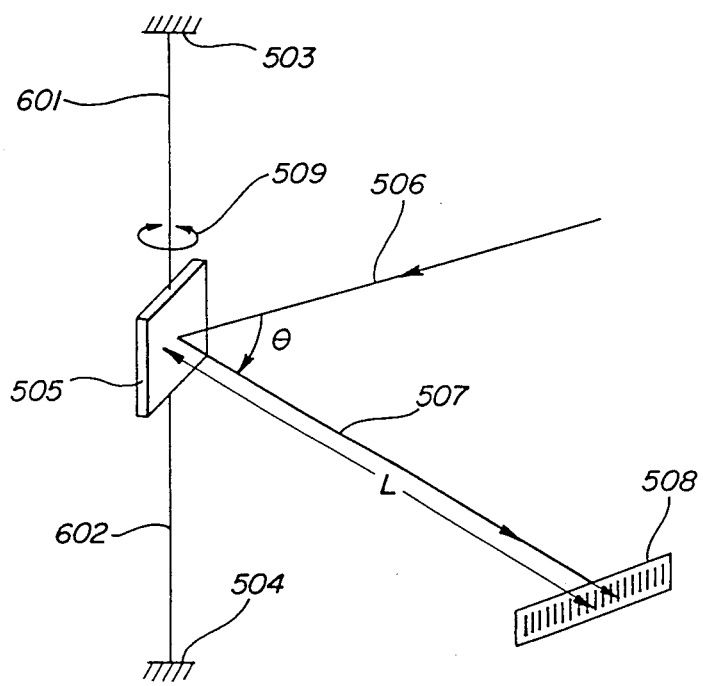
FIG. 5 schematically represents an optical lever apparatus, in which a distance simulator according to the present invention may be applied.

The foregoing text has explained the value of optical systems contructed according to the present invention in facilitating testing of other optical systems. It is important also to recognize that there are applications for the invention as a component of various optical instruments which are valuable in their own right. For example, FIG. 5 illustrates an optical lever, which is a component of various scientific instruments. In this apparatus, light beam 506 is reflected by mirror 505, becoming light beam 507. Suspension wires 601 and 602, supported respectively by solid supports 503 and 504, constrain mirror 505 so that its only permitted motion is rotation about the suspension axis, as suggested by arrow 509.

In use, auxiliary apparatus (not shown) causes mirror 505 to rotate by an amount related to the variable being measured. This variable might be, for example, the gravitational attraction of two large masses. The angle θ between beams 506 and 507 is proportional to the mirror rotation and is therefore a measure of the variable under study. This angle is measured by observing the point of incidence of beam 507 on scale 508.

The sensitivity of this apparatus is determined, in part, by the amount of deflection of the beam on scale 508 resulting from a small change in θ. This deflection is given by the formula:

$$\Delta x = L \Delta \theta$$

The proportionality of $\Delta x$ to L implies that for best sensitivity, the apparatus must be quite large. It will be seen, however, that by incorporating a distance simulator according to the present invention, in the midst of beam 507, the sensitivity achieved in an apparatus of any given size may be greatly increased.

It will be appreciated that while the above discussion has been conducted in terms of "light," which is normally interpreted to means electromagnetic radiation in the visible wavelength range, the present invention is equally applicable, given suitable lens or mirror elements to comprise the afocal optical systems, to any portion of the electromagnetic spectrum. In fact, the assignee of the present invention has already applied the invention successfully in the range of infrared radiation from 780 to 950 nm. Wherever the word "light" is used herein, it should therefore be understood to imply electromagnetic radiation of any suitable wavelength.

It will be appreciated that while the lenses shown in the drawings are simple lenses, afocal optical systems comprising more complex lens systems may be incorporated in the optical system of the present invention.

It will be appreciated that while the discussion above has referred repeatedly to "lenses," which is to say refractive optical elements, it is entirely possible to construct a distance simulator according to the present invention using reflective optical elements. Thus, for example, the phrase "afocal lens system" should be understood throughout to imply the more general "afocal optical system," which may be constructed entirely or in part of reflective optical elements. Similarly, "converging lens" and "diverging lens" are intended to imply "converging optical element" and "diverging optical element" respectively.

In any event it is, of course, necessary to insure that all optical elements in the distance simulator are sufficiently large in diameter that no significant part of a beam directed to the simulation system is blocked within the system.

Having described the invention in detail and by reference to preferred embodiments thereof, it will be apparent that modifications and variations are possible without departing from the scope of the invention defined in the appended claims.

What is claimed is:

1. An optical system for simulating the optical effect of traveling over a large distance on light traveling from a first reference surface to a second reference surface, said first and second reference surfaces being relatively closely spaced, comprising:
   a first afocal magnifying lens system for receiving light from said first reference surface and providing a magnification ratio of $M_1$,
   a second afocal magnifying lens system for receiving light from said first afocal magnifying lens system and transmitting it to said second reference surface with a magnification ratio of $M_2$, $M_2$ equaling $k/M_1$, and
   means for supporting said first and second afocal magnifying lens system such that they are spaced from one another by a distance D, the length of the distance which is simulated being equal to $D/M_1^2$ and the size of the output image being scaled by a factor k from the actual image being simulated.

2. The optical system of claim 1 in which k=1 such that $M_1$ substantially equals $1/M_2$ and the distance which is simulated is equal to $D/M_1^2$ or $M_2^2 D$.

3. The optical system of claim 1 in which said first afocal magnifying lens system comprises first converging lens means for receiving light from said first reference surface.

4. The optical system of claim 3 in which said first afocal magnifying lens system further comprising first diverging lens means for receiving light from said first converging lens means.

5. The optical system of claim 4 in which said first converging lens means and said first diverging lens means have coincident focal points.

6. The optical system of claim 3 in which said first afocal magnifying lens system further comprises second converging lens means for receiving light from said first converging lens means.

7. The optical system of claim 4 in which said first converging lens means and said second converging lens means have coincident focal points.

8. The optical system of claim 1 in which said second afocal magnifying lens system includes third converging lens means for receiving light from said first afocal magnifying lens system.

9. The optical system of claim 8 in which said second afocal magnifying lens system further comprises fourth converging lens means for receiving light from said third converging lens means and for directing it to said second reference surface.

10. The optical system of claim 1 in which said second afocal magnifying lens system includes second diverging lens means for receiving light from said first afocal magnifying lens system.

11. The optical system of claim 10 in which said second afocal magnifying lens system further comprises second converging lens means for receiving light from said second diverging lens means and for directing it to said second reference surface.

12. An optical system for providing a simulation to light traveling therethrough of a distance which is substantially greater than the distance which the light actually travels, comprising:
    a first afocal magnifying lens system for providing a magnification ratio of $M_1$ to light traveling therethrough,
    a second afocal magnifying lens system for providing a magnification ratio of $M_2$ equal to $K/M_1$ to light traveling therethrough, said second afocal magnifying lens system being axially aligned with said first afocal magnifying lens system, and
    means for supporting said first and second afocal magnifying lens systems from one another by a distance D, such that light which has passed through said first and second afocal magnifying lens systems appears as it would appear after traveling a distance $D/M_1^2$ and the size of the output image is scaled by a factor k from the actual image being simulated.

13. The optical system of claim 12 in which k=1 such that $M_1$ substantially equals $1/M_2$ and the distance which is simulated is equal to $D/M_1^2$ or $M_2^2 D$.

14. The optical system of claim 12 in which said first afocal magnifying lens system comprises first converging lens means for initially receiving light.

15. The optical system of claim 14 in which said first afocal magnifying lens system further comprises second converging lens means for receiving light from said first converging lens means.

16. The optical system of claim 15 in which said first and second converging lens means have coincident focal points.

17. The optical system of claim 14 in which said first afocal magnifying lens system further comprises first diverging lens means for receiving light from said first converging lens means.

18. The optical system of claim 17 in which said first converging lens means and said first diverging lens means have coincident focal points.

19. The optical system of claim 12 in which said second afocal magnifying lens system includes second diverging lens for receiving light from said first afocal magnifying lens system.

20. The optical system of claim 19 in which said second afocal magnifying lens system further comprises second converging lens means for receiving light from said second diverging lens means.

21. The optical system of claim 12 in which said second afocal magnifying lens system includes third converging lens means for receiving light from said first afocal magnifying lens system.

22. The optical system of claim 21 in which said second afocal magnifying lens system further comprises fourth converging lens means for receiving light from said third converging lens means.

23. An optical system for providing a simulation to light traveling therethrough of a distance which is substantially greater than the distance which the light actually travels, comprising:
- an afocal lens system for providing a magnification ratio of $M_1$ to light traveling therethrough, $M_1$ having a magnitude less than 1,
- means for imaging the light after it has travelled a distance D beyond said afocal lens system to generate an observable pattern, and
- scaling means, for multiplying the scale of said observable pattern by $1/M_1$, so as to simulate the effect of propagation through distance $D/M_1^2$.

24. A system, as in claim 23, in which said scaling means comprise a video camera and monitor.

* * * * *

UNITED STATES PATENT AND TRADEMARK OFFICE
CERTIFICATE OF CORRECTION

PATENT NO. : 4,852,983

DATED : August 1, 1989

INVENTOR(S) : Michael Fein

It is certified that error appears in the above-identified patent and that said Letters Patent is hereby corrected as shown below:

Col. 2, line 49 "coverging" should be --converging--.

Col. 4, line 40, "a" should be --$\underline{a}$--.
Col. 4, line 43, "a, B = aR + A" should be --$\underline{a}$, B = $\underline{a}$R + A--.
Col. 6, line 26 "exactly" should be --$\underline{exactly}$--.
Col. 6, line 28 "size" should be --$\underline{size}$--.
Col. 6, line 68 "32" should be --$\underline{32}$--.
Col. 7, line 22 "second" should be --$\underline{second}$--.
Col. 7, line 26 "first" should be --$\underline{first}$--.
Col. 7, line 30, "first" should be --$\underline{first}$--.
Col. 7, line 32 "second" should be --$\underline{second}$--.
Col. 4, line 42, "a" should read --$\underline{a}$--.

Signed and Sealed this

Fourteenth Day of August, 1990

Attest:

HARRY F. MANBECK, JR.

*Attesting Officer*  *Commissioner of Patents and Trademarks*